US012662352B2

(12) United States Patent
Walther

(10) Patent No.: US 12,662,352 B2
(45) Date of Patent: Jun. 23, 2026

(54) ELEVATOR OPERATING DEVICE HAVING TWO CALL INPUT DEVICES DISPOSED SEPARATE FROM EACH OTHER WITH RESPECT TO PASSENGERS

(71) Applicant: INVENTIO AG, Hergiswil (CH)

(72) Inventor: Jacqueline Walther, Emmenbrücke (CH)

(73) Assignee: Inventio AG, Hergiswil (CH)

( * ) Notice: Subject to any disclaimer, the term of this patent is extended or adjusted under 35 U.S.C. 154(b) by 894 days.

(21) Appl. No.: 17/914,982

(22) PCT Filed: Apr. 22, 2021

(86) PCT No.: PCT/EP2021/060463
§ 371 (c)(1),
(2) Date: Sep. 27, 2022

(87) PCT Pub. No.: WO2021/214189
PCT Pub. Date: Oct. 28, 2021

(65) Prior Publication Data

US 2023/0150795 A1 May 18, 2023

(30) Foreign Application Priority Data

Apr. 23, 2020 (EP) .................................... 20171084

(51) Int. Cl.
*B66B 1/46* (2006.01)
*B66B 1/34* (2006.01)
*B66B 3/00* (2006.01)

(52) U.S. Cl.
CPC ............ *B66B 1/468* (2013.01); *B66B 1/3461* (2013.01); *B66B 3/002* (2013.01);
(Continued)

(58) Field of Classification Search
CPC . B88B 1/468; B88B 1/3461; B88B 2201/103; B88B 2201/4615; B88B 2201/4623; B88B 2201/463
See application file for complete search history.

(56) References Cited

U.S. PATENT DOCUMENTS 4,678,062 A 7/1987 Sumka
5,679,933 A 10/1997 Weber et al.
(Continued)

FOREIGN PATENT DOCUMENTS

CN 103964279 A 8/2014
CN 107635901 A 1/2018
(Continued)

OTHER PUBLICATIONS

International Search Report for International Application No. PCT/EP2021/060463 dated Jun. 15, 2021.

*Primary Examiner* — Rina I Duda
(74) *Attorney, Agent, or Firm* — Knobbe, Martens, Olson & Bear, LLP

(57) ABSTRACT

An elevator operating device for inputting a travel request in an elevator system has a first call input device that is communicatively connected to a central control device of the elevator operating device. The first call input device comprises buttons that are each assigned to a floor of a building and are disposed so as to be accessible to a first passenger for inputting a destination floor. A second call input device of the elevator operating device is communicatively connected to the central control device and disposed so as to be accessible to a second passenger for inputting a destination floor. The first call input device and the second call input device are disposed at a distance from each other on the passenger side.

14 Claims, 2 Drawing Sheets

(52) U.S. Cl.
CPC . *B66B 2201/103* (2013.01); *B66B 2201/4615* (2013.01); *B66B 2201/4623* (2013.01); *B66B 2201/463* (2013.01)

(56) References Cited

U.S. PATENT DOCUMENTS

| | | | | |
|---|---|---|---|---|
| 5,689,094 | A | 11/1997 | Friedli | |
| 6,105,729 | A * | 8/2000 | Nakamori | B66B 1/462 187/901 |
| 6,410,871 | B1 | 6/2002 | Rarbach | |
| 6,502,668 | B1 * | 1/2003 | Chida | H01H 13/70 187/391 |
| 6,508,334 | B1 * | 1/2003 | Matsuda | B66B 1/468 187/391 |
| 6,902,041 | B2 * | 6/2005 | Eccleston | B66B 1/463 187/901 |
| 7,021,428 | B2 * | 4/2006 | Han | B66B 1/461 187/901 |
| 7,038,667 | B1 * | 5/2006 | Vassallo | G06F 3/016 345/184 |
| 8,807,287 | B2 * | 8/2014 | Li | B66B 1/461 187/391 |
| 9,469,502 | B2 * | 10/2016 | Parkkinen | B66B 3/006 |
| 9,718,641 | B2 | 8/2017 | Finschi | |
| 2004/0000453 | A1 | 1/2004 | Eccleston | |
| 2009/0066474 | A1 * | 3/2009 | Kawachi | H03K 17/9631 340/3.1 |
| 2009/0211882 | A1 * | 8/2009 | Hirano | G01D 5/25 200/4 |
| 2010/0108476 | A1 * | 5/2010 | Trudeau | G05G 25/04 200/14 |
| 2018/0127234 | A1 | 5/2018 | Lofberg et al. | |
| 2018/0305174 | A1 * | 10/2018 | Muncy | B66B 3/006 |

FOREIGN PATENT DOCUMENTS

| | | | |
|---|---|---|---|
| DE | 19928229 | A1 | 12/2000 |
| EP | 0699617 | B1 | 5/2000 |
| EP | 2 331 443 | B1 | 5/2013 |
| JP | 2007008604 | A | 1/2007 |
| WO | WO 2005121003 | A2 | 12/2005 |
| WO | WO 2008154807 | A1 | 12/2008 |

* cited by examiner

ELEVATOR OPERATING DEVICE HAVING TWO CALL INPUT DEVICES DISPOSED SEPARATE FROM EACH OTHER WITH RESPECT TO PASSENGERS

TECHNICAL FIELD

The technology described herein relates in general to an elevator system in a building. Embodiments of the technology relate in particular to an elevator operating device that is suitable for passengers with and without physical disabilities, to an elevator system having such an elevator operating device, and to a method for operating such an elevator system.

SUMMARY

In buildings having elevator systems, elevator operating devices are provided, by means of which a passenger can input an elevator call. Elevator operating devices may be disposed on the individual floors. In known elevator systems, an elevator operating device disposed on a floor has up/down buttons, such that the passenger can input the desired direction of travel. In this elevator system, an elevator operating device is provided in the elevator car, by means of which device the passenger in the elevator car can input the desired destination floor. In other known elevator systems, the passenger can already input the destination floor on the floor on an elevator operating device. For this purpose, the elevator system is equipped with destination call control technology, and the elevator operating devices disposed on the floors each have either a keyboard, a touch-sensitive screen, and/or a data acquisition device (e.g., in the form of an RFID card reader known from EP 0699617 B1) for input of the destination floor.

Elevator operating devices should also be conveniently and reliably operable for passengers with restricted mobility. Restricted mobility may be due to physical impairments, such as of vision, hearing, or physical mobility. Different approaches are known for meeting these requirements. Elevator operating devices, for example, which each have or display a special button (for example, having a symbol for a wheelchair) are generally known. If this button is actuated, the elevator system switches to a disability-friendly operating mode. In addition, it is known from EP 2 331 443 B1, for example, that an elevator operating device having a touch-sensitive screen changes to a special input mode when a type of wandering movement is detected on the touch screen.

Although the approaches mentioned make it easier for a passenger with restricted mobility to operate an elevator system, there may be a requirement for an elevator location and/or for a building to offer such a passenger additional functionality without negatively affecting the ease of use or the operation by passengers without restricted mobility. There is therefore a need for a technology that fully or at least partially meets these requirements.

One aspect of the technology described herein relates to an elevator operating device for inputting an elevator call in an elevator system. The elevator operating device has a communication device that is configured to communicate with an elevator controller of the elevator system, and a central control device that is communicatively connected to the communication device. A first call input device of the elevator operating device is communicatively connected to the central control device and comprises buttons that are each assigned to a floor of a building and are disposed in the elevator operating device so as to be accessible to a first passenger for inputting a destination floor. A second call input device of the elevator operating device is communicatively connected to the central control device and is disposed so as to be accessible to a second passenger for inputting a destination floor step by step. The first call input device and the second call input device are disposed at a distance from each other on the passenger side.

A further aspect of the technology described herein relates to an elevator system having such an elevator operating device. In one embodiment, the elevator operating device is disposed in an elevator car of the elevator system. In another embodiment, the elevator operating device is disposed on a floor of a building. The elevator operating device is therefore not limited to a specific control technology implemented in the elevator system.

Another aspect of the technology relates to a method for operating an elevator system. The method comprises detecting when an elevator operating device disposed in the elevator system is touched. The elevator operating device comprises a first call input device having buttons that are each assigned to a floor of a building and are disposed in the elevator operating device so as to be accessible to a first passenger for inputting a destination floor, and comprises a second call input device. The second call input device is disposed so as to be accessible to a second passenger for inputting a destination floor step by step. The first call input device and the second call input device are disposed at a distance from each other on the passenger side. A destination floor is displayed by a display device of the elevator operating device when the first passenger touches a button on the first call input device in order to input an elevator call to a desired destination floor of the first passenger. The floor is changed step by step and the display device displays the changed floor when the second passenger touches the second call input device to select a desired destination floor of the second passenger. A confirmation input at the second call input device by the second passenger is detected, whereby the displayed floor is input as an elevator call to the desired destination floor of the second passenger. The method also comprises registering and executing the elevator call input by the first or second passenger.

The technology described herein creates an elevator operating device that comprises two call input devices disposed separately from each other. An elevator call to one of the floors in the building can be input at each of these call input devices independently of the other. Passengers without restricted mobility can input a desired destination floor on the first call input device, specifically in a known manner by touching or pressing a button that is assigned to the desired destination floor. Passengers with restricted mobility can input a desired destination floor on the second call input device. The second call input device allows the passenger to change the (displayed) floor step by step (floor by floor) until the desired destination floor is reached or displayed; this is possible step by step (floor by floor) using a single actuating device. In one embodiment, a rotary knob is used as the actuating device. A passenger with restricted mobility can therefore merely operate the rotary knob in order to input calls; it is not necessary to grasp or feel another actuating device.

In one embodiment, the first call input device comprises a touch-sensitive screen system, the screen system being configured to display a button as a touch-sensitive field having a symbol, in particular a call symbol, assigned to the button. Passengers are familiar with touch-sensitive screen systems from different applications. A passenger (with or without restricted mobility) can thus input a desired destination floor on the first call input device in a known manner.

As an alternative to a touch-sensitive screen system, in one embodiment, the buttons of the first call input device may be configured in the form of electromechanical buttons, a button comprising a symbol, in particular a call symbol, assigned thereto. There is flexibility with regard to the design of the first call input device, in particular its buttons, so that the elevator operating device can be adapted to the conditions in a building.

There is also flexibility with regard to the arrangement of the buttons of the first call input device. In one embodiment, they may be disposed in the shape of a matrix. In another embodiment, the buttons may be disposed in a single row; this row may be disposed substantially vertically or horizontally.

In one embodiment, the second call input device comprises a rotary knob. Again, this is a control element that passengers are usually familiar with.

In one embodiment, the rotary knob is configured as a retractable rotary knob; it has a control element having a passenger-side front side. In a retracted position, the front side of the control element is substantially planar with respect to a passenger-side front surface of the elevator operating device. In a protruding position, the control element protrudes from the passenger-side front surface. If the control element is not required for inputting calls, the rotary knob is in the retracted position; in the retracted position, the control element does not interfere and is better protected from damage.

In one embodiment of the elevator operating device, the second call input device comprises a rotary encoder that is configured to convert an angle change, caused by the passenger by turning the rotary knob by a specified angle, into a specified change in a manipulated variable, a central control device of the elevator operating device being configured to convert the change into a floor change. According to one embodiment, an angle change caused by the passenger may be displayed to the passenger directly as a floor change. In one embodiment, the passenger can turn the rotary knob until the desired floor is displayed.

In one embodiment, the second call input device is configured to detect when the passenger touches the rotary knob as a confirmation action by the passenger and to generate a confirmation signal that the central control device recognizes as an input of the destination floor. For example, if the passenger has turned the rotary knob until the desired floor is displayed, he can carry out the confirmation action. The confirmation action may consist, for example, in the passenger intuitively acting on the rotary knob, in particular pressing or touching the front side thereof.

In one embodiment, the elevator operating device comprises a display device for displaying a floor. The display device is communicatively connected to the central control device and is configured, when activated by the central control device, to display the floor input by the first call input device or the floor determined by the second call input device. The floor determined by the second call input device may be a floor displayed after each angle change caused by turning the rotary knob or (when the passenger stops turning) the desired floor. This gives the passenger visual feedback; this may be supplemented by an audible feedback.

In an embodiment of the elevator operating device, the first call input device is disposed on the passenger side between the display device and the second call input device. The rotary knob of the second call input device is thus disposed at a lower height than the keypad of the first call input device. The rotary knob is therefore easily accessible for a passenger P in a wheelchair without said passenger having to move his hand over the keypad in order to turn the rotary knob, for example. This prevents a button 23 from being touched accidentally.

BRIEF DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION

Figure 1:
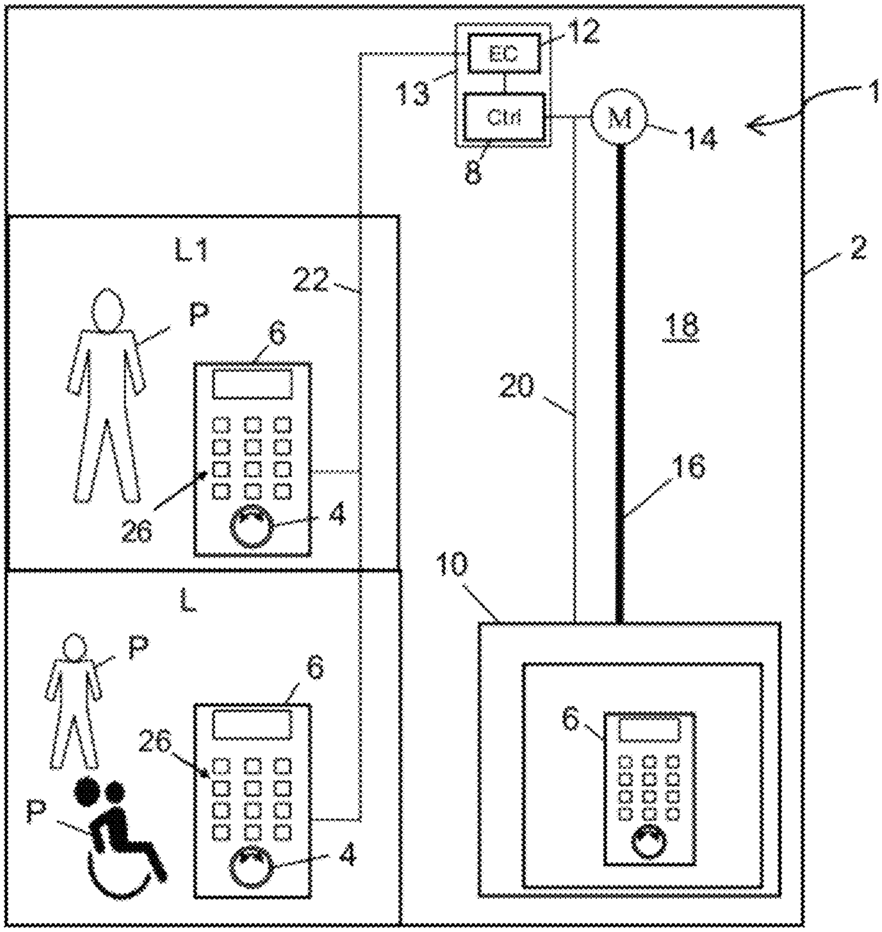
FIG. 1 is a schematic view of an example of a situation in a building having a plurality of floors and an example of an elevator system.

FIG. 1 is a schematic view of an example of a situation in a building 2 that has a plurality of floors L, L1 that are served by an elevator system 1. The floor L may be an entrance hall of the building 2, into which the passengers P enter when accessing the building 2 and from which the passengers leave the building 2 again. If a passenger P enters the floor L, each floor L, L1 of the building 2 may be reached from there, with appropriate access authorization, by means of the elevator system 1. For the purpose of illustration, of the elevator system 1, only an elevator controller 13, a drive machine 14, a suspension means 16 (e.g., steel cables or flat belts), and an elevator car 10 (hereinafter also referred to as car 10), which is suspended on the suspension means 16 and movable in a shaft 18, and a number of elevator operating devices 6 are shown in FIG. 1. A person skilled in the art will recognize that the elevator system 1 may also comprise a plurality of cars 10 in one or more shafts 18 that are controlled by a group controller. Instead of a traction elevator (shown in FIG. 1), the elevator system 1 may also have one or more hydraulic elevators.

The elevator system 1 may be configured according to one of the control technologies mentioned above (up/down controller or destination call controller). A person skilled in the art will recognize that, depending on the control technology implemented in the building 2, the elevator operating devices 6 are configured and disposed accordingly. In the situation shown in FIG. 1, elevator operating devices 6 for both control technologies are shown for illustration purposes. The mentioned control technologies are known to a person skilled in the art, so that detailed explanations do not appear necessary; hereinafter, this is only discussed to the extent that it appears helpful for understanding the technology described herein.

If the elevator system 1 is equipped with a destination call controller, the elevator operating devices 6 are disposed on floors L, L1 and are connected to a destination call control device 12 via a communication network 22. A passenger P can input a desired destination floor on an elevator operating device 6 on the floor L, L1; after the input of the destination floor by the passenger P (e.g., the input of a destination call), information about the boarding floor and the destination floor is available. The boarding floor results from the location of the elevator operating device 6, at which the destination floor is input. The destination call control device 12 assigns an elevator car 10 to the input destination call, and an elevator control device 8 controls the movement of the assigned elevator car 10 according to the destination call. In the car 10, it is usually not possible to input a travel request to a destination floor; the elevator operating device 6 shown in FIG. 1 is not provided in an elevator system 1 having a destination call controller.

If the elevator system 1 is equipped with an up/down controller, operating devices (not shown) are disposed on the floors L, L1, on which a passenger P can input the desired direction of travel; the (floor-side) elevator operating devices 6 shown in FIG. 1 and the destination call control device 12 are not provided in an elevator system 1 having an up/down controller. The desired destination floor is then input in the car 10 on the elevator operating device 6 disposed there. A communication line 20 connects the (car-side) elevator operating device 6 to the elevator controller 13. The current position of the car 10 (and thus the boarding floor) is stored in the elevator controller 13 and results from the last movement of the car 10.

In the situation shown in FIG. 1 and according to an embodiment of the elevator system 1, elevator operating devices 6 which are provided for different passenger groups are advantageously used with the technology described herein. For illustration purposes, a standing (first) passenger and a (second) passenger seated in a wheelchair, for which the same reference sign (P) will be used hereinafter, are shown in FIG. 1. Briefly and by way of example, the technology described herein allows passengers P who have a physical disability, for example, limited mobility (e.g., need a wheelchair to move around) or limited vision (e.g., in the case of blindness), to also use the elevator operating devices 6 that are specially configured for their needs. A (second) call input device 4 is provided for this purpose. In addition, passengers P without such a physical disability can also use the elevator operating devices 6; a (first) call input device 28 is provided for this purpose. The (first) call input device 28 and the (second) call input device 4 are disposed at a distance from each other on the passenger side.

As shown by way of example in FIG. 1, each elevator operating device 6 comprises a call input device 4 which, in the embodiment shown, comprises a rotary knob that is accessible to a passenger P. The part of the call input device 4 that is accessible to the passenger P is referred to hereinafter as the rotary knob 4; a person skilled in the art will recognize that the call input device 4 may comprise additional components that form the functionality of the call input device 4 together with the rotary knob. The rotary knob 4 can be identified on a front side **4*b* facing the passenger P (e.g., by a symbol for a wheelchair and/or by Braille lettering). In addition, each elevator operating device 6 comprises a call input device 28. In the embodiment shown, the call input device 28 (also shown in FIG. 1) comprises an interface device 26 accessible to the passenger P. A person skilled in the art will recognize that the call input device 28 may comprise additional components that, together with the interface device 26, form the functionality of the call input device 28**.

Figure 2:
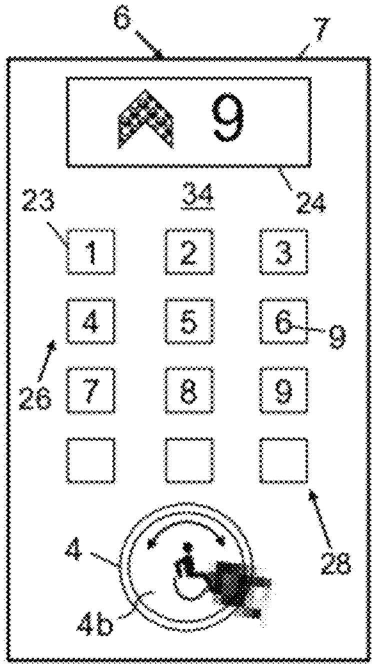
FIG. 2 is a schematic view of a first embodiment of an elevator operating device that is disposed in the elevator system according to FIG. 1.

FIG. 2 is a schematic view of a first embodiment of an elevator operating device 6, which may be disposed on a floor L, L1 or in the elevator car 10 in the elevator system according to FIG. 1. A person skilled in the art will recognize that the elevator operating device 6 is disposed at a height that is user-friendly or prescribed by a standard. In the embodiment shown, the interface device 26 of the elevator operating device 6 comprises individual buttons 23 that form a keypad, a display device 24, and the rotary knob 4. The rotary knob 4 is separate and disposed at a distance from the keypad. From the perspective of the passenger P, the display device 24 is disposed above the keypad, and the rotary knob 4 is disposed below the keypad. The rotary knob 4 is thus disposed at a lower height than the keypad, making it easily accessible for a passenger P in a wheelchair. For example, the passenger P can operate the rotary knob 4 from the front, from below, or from one side without having to guide his hand over the keypad; unintentional touching of a button 23 is thereby avoided. For example, the passenger P can press the front side **4*b* of the rotary knob 4, whereupon the rotary knob 4 protrudes from the front (passenger-side) surface of the elevator operating device 6 and the passenger P can turn said rotary knob to select a floor; to confirm the floor, the passenger P can press the front side 4*b*** again.

In the embodiment shown in FIG. 2, the buttons 23 are disposed in the shape of a matrix. In a second embodiment shown in FIG. 5, the buttons 23 are disposed in the shape of a single vertical row. Alternatively, in a further embodiment, the buttons 23 may be disposed in a horizontal row. The buttons 23 are, for example, rectangular, but they may also have a different shape, e.g., round or oval. The buttons 23 may be identified with symbols 9, in particular call symbols. For illustration purposes, some of the buttons 23 having call symbols 9 are numbered from one to nine; the unnumbered buttons may be provided for an alarm function and door control functions (door open/door close). For example, if the passenger P touches the button 23 having the number "9," a call, i.e., a travel request from the boarding floor to the ninth floor, is initiated. A person skilled in the art will recognize that the number of buttons 23 is adapted to the building 2.

In one embodiment, the interface device 26 may comprise a touch-sensitive screen system 30 (see FIG. 6) having a touch-sensitive (sensor) screen (hereinafter also referred to as a touchscreen). A passenger-side surface of the screen is referred to hereinafter as the front surface 11 (see FIG. 3). The screen may be configured as a touch-sensitive screen on its entire front surface 11 or only on a part (or parts) thereof. The touchscreen is a user interface 34 that is visible to the passenger P, the user interface 34 being a graphical user interface (GUI) that has the buttons 23 and allowing communication between the passenger P and the elevator system 1. If the passenger P touches one of the buttons 23 to input the desired destination floor, the elevator system 1 or the elevator operating device 6 confirms this touch to the passenger P. The touched button 23 can, for example, light up, and/or the display device 24 shows the selected destination floor. This destination floor is shown in FIG. 2. The display device 24 shown in FIG. 2 also shows the direction of travel (here: up). A person skilled in the art will recognize that the display device 24 may display additional and/or different information (e.g., "Out of order" or "Do not use").

Figure 3:
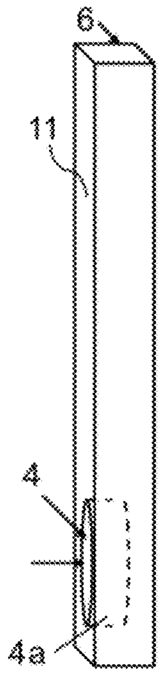
FIG. 3 is a schematic side view of the elevator operating device according to FIG. 2, with a retractable rotary knob being shown in a retracted position.
Figure 4:
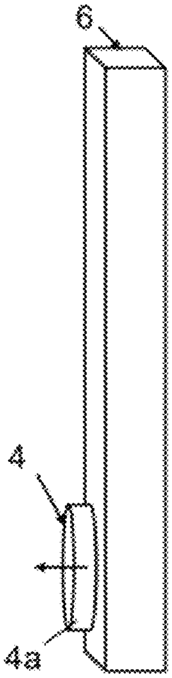
FIG. 4 is a schematic side view of the elevator operating device according to FIG. 2, with a retractable rotary knob being shown in a protruding position.

The rotary knob 4 may be configured as a retractable rotary knob which, in one embodiment, can assume a retracted position shown in FIG. 3 and a protruding position shown in FIG. 4. In the retracted position, the front side 4*b* of the rotary knob 4 lies substantially in the plane of the front surface 11 of the screen; in the retracted position, the rotary knob 4 is not intended for turning. In the protruding position, the rotary knob 4 protrudes from the plane of the front surface 11 so that the passenger P can grip the rotary knob to turn it. In one embodiment, the rotary knob 4 has a control element 4*a* that is pretensioned by a spring, for example, and a latching mechanism. If the rotary knob 4 is in the retracted position and the passenger P presses the control element 4*a* (indicated by an arrow in FIG. 3), the latching mechanism is released and the spring presses the control element 4*a* outward in the direction of the passenger P (indicated by an arrow in FIG. 4). A rotary knob having such a functionality is known, for example, from DE 19928229 A1.

In another embodiment, the call input device 4, which in the embodiment shown comprises the rotary knob 4, may comprise an electric motor that moves the rotary knob 4 from the retracted position into the protruding position and vice versa. The rotary knob 4 is configured to detect a touch by the passenger P; the rotary knob 4 may be configured, for example, having a touch-sensitive front side 4*b* that generates an electrical signal when touched. If the passenger P touches the rotary knob 4 or its front side 4*b*, the electrical signal is generated. Based on this electrical signal, a control signal is generated which controls the motor in order to move the rotary knob 4 from the one position into the other position. If the passenger P touches the front side 4*b* after he has set the desired floor using the rotary knob 4, this touch is also evaluated as an input confirmation.

In another embodiment, the rotary knob 4 may be configured as a non-retractable rotary knob. In this embodiment, the rotary knob 4 protrudes permanently from the plane of the front surface 11. The rotary knob may also be equipped with a touch-sensitive front side 4*b*.

Figure 6:
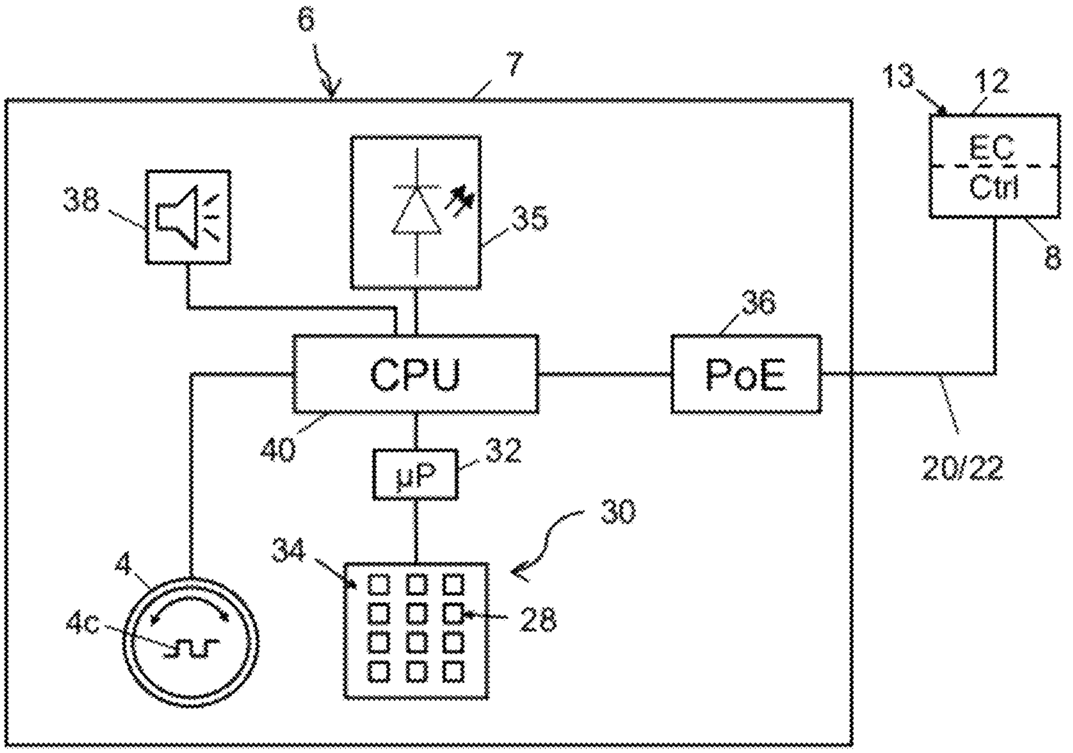
FIG. 6 is a schematic view of an example of components disposed in the elevator operating device according to FIG. 2 and the connections thereof.

According to one embodiment, the call input device 4 (or its rotary knob) is equipped with a rotary encoder 4*c* (see FIG. 6). Rotary encoders (also called incremental encoders or encoders) are known to a person skilled in the art and may be configured to detect angle changes and a direction of rotation. As a control element for an electronic device, such a rotary encoder may be configured as an "endless rotary adjuster," i.e., it can be turned indefinitely until a desired input is reached. Each angle change by a specified angle to the left or to the right results in a specified change in a manipulated variable (e.g., a floor number is increased or decreased by one (increment (+1) or decrement (−1))). When turning, a user may be given haptic feedback for the turning movement every time the angle changes by the specified angle, e.g., by means of a detent provided in the rotary encoder. In one embodiment, the rotary encoder is equipped with a touch-sensitive surface, a sensor, or a button in order make it possible to confirm an input (for example, the desired floor) in a manner that is independent and separate from turning. In the case of a confirmation action by the passenger P, e.g., pressing or touching, a confirmation signal is generated, which the central control device 40 recognizes as the input of the destination floor.

In one embodiment, the rotary encoder is a (relatively compact) unit that may be integrated into rotary knob 4. The angle change may also be detected by means of a gear or a belt drive. The rotary knob 4 may have a rotary shaft which acts on the gear or on a drive wheel of the belt drive. The gear or the belt drive may be disposed in the call input device 4 and connected to the rotary knob via the rotary shaft.

The elevator operating device 6 may have a housing 7 that may be disposed as a flush-mounted or surface-mounted installation on a building wall; in one embodiment, the housing 7 may be disposed on a base or a pedestal in order to install the elevator operating device 6 standing on the floor in an elevator access region. In the car 10, the housing 7 may be disposed on a car wall, for example, mounted on the car wall or more or less installed in the car wall. If an elevator operating device 6 is installed in a wall, a housing may possibly be omitted.

Figure 5:
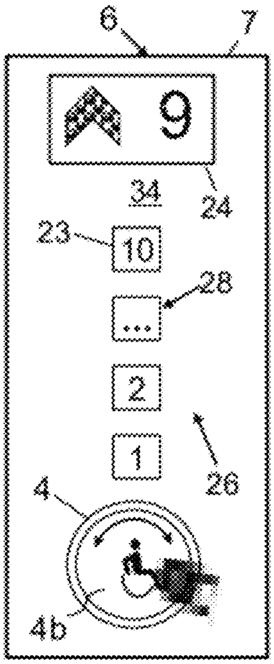
FIG. 5 is a schematic view of a second embodiment of an elevator operating device that is disposed in the elevator system according to FIG. 1.

FIG. 6 is a schematic view of components disposed in the elevator operating device 6 according to FIG. 2 or FIG. 5 and the connections thereof. A person skilled in the art will recognize that the arrangement of these components and the manner in which they are communicatively connected are exemplary. In the embodiment shown, a touch-sensitive screen 30 (touchscreen 30) having the user interface 34 and the symbolically drawn keypad, the rotary knob 4, a central control device 40 (CPU), an illumination device 35, an electro-acoustic transducer 52 (e.g., a speaker), and a communication device 36 (PoE, Power over Ethernet) are disposed in the housing 7. The central control device 40 is communicatively connected to the components mentioned in order to ensure the operation and the functions of the elevator operating device 6.

In the embodiment shown, the touchscreen 30 comprises a transparent glass plate (not shown) and a processor 32. The buttons 23 of the keypad are visible to the passenger P through the transparent glass plate. The processor 32 is connected to the central control device 40 and generates, for example, a signal when a passenger P touches one of the buttons 23 using a finger. The buttons 23 are assigned to destination floors, it being possible for floor-specific information to also be displayed. The structure and function of a touchscreen, in particular for inputting calls, are known to a person skilled in the art, and further explanations therefore do not appear to be necessary. In one embodiment, the central control device 40 controls the transducer 38 (speaker) in order to also communicate the input destination floor to the passenger P audibly, for example, by means of speech.

The illumination device 35 is used to illuminate the user interface 34 of the elevator operating device 6, or only regions of the user interface 34. Controlled by the central control device 40, the illumination device 35 may illuminate the user interface 34 so that the displayed buttons 23 and the rotary knob 4 may be perceived by the passenger P, in particular in poor light conditions. The illumination device 35 may also illuminate the user interface 34 or individual buttons 23 using colored light, for example, in order to confirm the input of an elevator call. In one embodiment, the illumination device 35 comprises one or more LED light sources.

The rotary knob 4 is connected to the central control device 40. The central control device 40 recognizes the step-by-step change by a specified amount, which change is caused by turning the rotary knob 4, and controls the display device 24 in such a way that the next floor (depending on the direction of travel) is displayed after each change (increment or decrement). In addition, the central control device 40 may control the transducer 38 (speaker) in order to communicate the currently displayed floor to the passenger P, for example, by means of speech. If the passenger P wishes to be transported to the currently displayed floor, he can confirm this by pressing the rotary knob 4. The central control device

40 recognizes the confirmation and communicates the call via the communication device 36 (PoE) to the elevator controller 13.

The communication network 22 connects the floor-side elevator operating devices 6 to the elevator controller 13 and thus makes communication possible between the elevator controller 13 and the elevator operating devices 6. For this communication, the elevator operating devices 6 and the elevator controller 13 may be directly or indirectly connected to the communication network 22. The communication network 22 may comprise a communication bus system, individual data lines, or a combination thereof. Depending on the implementation of the communication network 22, individual addresses and/or identifiers can be allocated to the elevator controller 13 and each elevator operating device 6, such that, for example, the elevator controller 13 can send a message to a desired elevator operating device 6 in a targeted manner. Communication can take place in accordance with a protocol for wired communication, for example, the Ethernet protocol. In one embodiment, the elevator operating devices 6 are supplied with electrical energy via the communication network 22 (PoE). If the elevator operating device 6 is disposed in the car 10, the communication line 20 is used in one embodiment for communication and for supplying energy to the elevator operating device 6.

Figure 7:
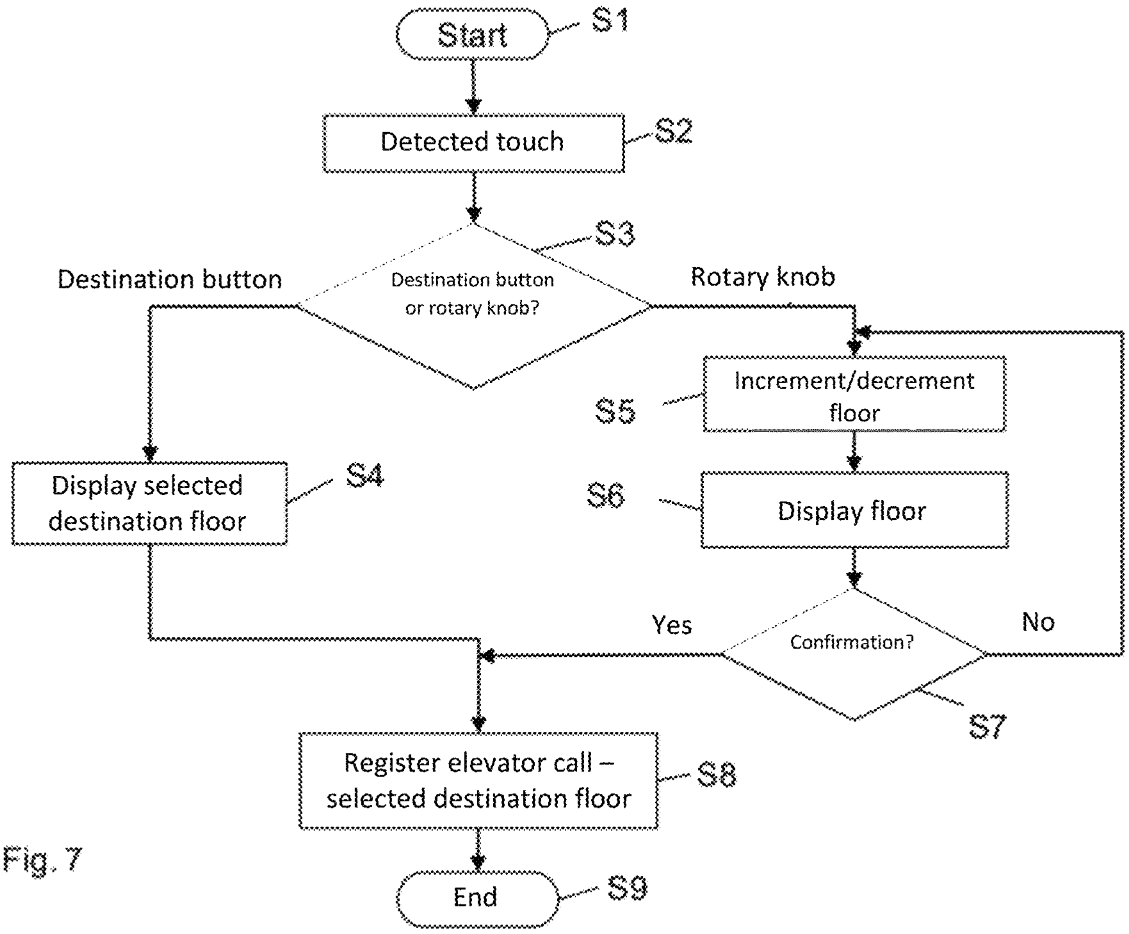
FIG. 7 is an example of a view of an embodiment of a method for operating the elevator system.

With the understanding of the above-described basic system components of the elevator system 1 and their functionalities, a description of an example of a method for operating the elevator system 1 shown in FIG. 1 is given below with reference to FIG. 7. FIG. 7 shows an example of a flow chart of the method; it begins at step S1 and ends at step S9. A person skilled in the art will recognize that the division into these steps is exemplary and that one or more of these steps may be divided into one or more sub-steps or that a plurality of the steps may be combined into one step.

The method is described substantially with reference to a passenger P who moves around in a wheelchair. It is assumed that the passenger P is within reach of an elevator operating device 6 and would like to input a travel request (call) thereon in order to be transported from a current floor L, L1 to a destination floor L, L1 by the elevator. The passenger P can be located on a floor L, L1 or in the car 10 (depending on the implemented control technology).

If the passenger P touches the elevator operating device 6, this is detected in a step S2. For example, the processor 32 recognizes whether and where the passenger P touches the touchscreen 30. If the passenger P touches a button 23 that is assigned to a destination floor, this is detected in a step S3 and the method proceeds to a step S4.

The selected destination floor is displayed in step S4. The destination floor can be displayed, for example, by the number of the destination floor being displayed in the display device 24. Instead of the number, another floor identifier (e.g., as text (reception, restaurant)) can also be displayed. The destination floor can also be displayed, for example, by the button 23 touched by the passenger P lighting up, being illuminated, and/or being identified by color. An audible notification may also be provided, as described above.

In a step S8, which immediately follows step S4 in the embodiment in FIG. 7, a travel request (elevator call) to the selected destination floor is registered. The registration takes place in the elevator controller 13, which then initiates the movement of the car 10 according to the elevator call.

Referring again to step S2, if the passenger P touches the rotary knob 4, this is detected in step S3 and the method proceeds to a step S5. The touching of the rotary knob 4 is detected, for example, by the passenger P pressing the rotary knob 4 and the rotary knob 4 thereby being moved from the retracted position into the protruding position, as indicated in FIG. 3 and FIG. 4.

In step S5, the floor is changed step by step (incremented or decremented). As mentioned above, the passenger P can turn the rotary knob 4 to the left or right until the desired destination floor is displayed. Floors that lie between the boarding floor and the desired destination floor are displayed step by step (floor by floor) on the display device 24. The floors that lie therebetween and the destination floor are each displayed by the display device 24 in a step S6.

The detent, which is provided in one embodiment in the rotary encoder of the rotary knob 4, gives the passenger P haptic feedback for the turning. With each change from one detent to the adjacent detent, the rotary encoder generates an electrical signal that indicates the change (increment or decrement). Since the rotary knob 4 is connected to the central control device 40, the central control device 40 evaluates the signal, determines the resulting floor, and controls the display device 24 to display the floor (step S6).

In a step S7, after each change of floor, a check is made as to whether the passenger P confirms the currently displayed floor. By means of the confirmation, the passenger P indicates that the currently displayed floor is the desired destination floor. In one embodiment, the confirmation takes place in that the passenger P undertakes the stated confirmation action, for example, deliberately pressing the rotary knob 4 or touching its front side 4*b*. The rotary knob 4 can be returned to the retracted position by the passenger P. If there is no confirmation of the floor within a specified period of time (a few seconds), the rotary knob 4 is returned to the retracted position and no further action is initiated. In another embodiment, the confirmation can take place in that the process takes place automatically, i.e., without any further activity on the part of the passenger P, after a specified period of time (e.g., 3-4 seconds), which restarts after each change, has elapsed. Thereafter, the rotary knob 4 can be returned to the retracted position, for example, by the motor mentioned above.

If there is a confirmation in step S7, the method proceeds to step S8 described above. However, if there is no confirmation, the method returns to step S5. Steps S5 and S6 are repeated until a confirmation takes place. Under certain circumstances, after the rotary knob 4 has initially been turned, the passenger P can revoke the travel request and cancel the call input. After a further specified period of time has elapsed, the method is aborted. The rotary knob 4 is then returned to the retracted position.

The invention claimed is:

1. An elevator operating device for inputting a travel request in an elevator system, the device comprising:

a communication device that is configured to communicate with an elevator controller of the elevator system;

a central control device that is communicatively connected to the communication device;

a first call input device that is communicatively connected to the central control device, wherein the first call input device comprises buttons that are each assigned to a floor of a building and are disposed in the elevator operating device so as to be accessible to a first passenger for inputting a destination floor; and a second call input device that is communicatively connected to the central control device and is disposed so as to be accessible to a second passenger for inputting a destination floor step by step, wherein the first call input device and the second call input are disposed at a distance, wherein the second call input device comprises a rotary knob configured as a retractable rotary knob that has a control element having a passenger-side front side, wherein, in a retracted position, the front side of the control element is substantially planar with a passenger-side front surface of the elevator operating device, and wherein, in a protruding position, the control element protrudes from the passenger-side front surface.

2. The device of claim 1, wherein the first call input device comprises a touch-sensitive screen system, wherein the screen system is configured to display a button as a touch-sensitive field having a symbol assigned to the button.

3. The device of claim 1, wherein the buttons of the first call input device are configured as electromechanical buttons, and wherein at least one button comprises a symbol assigned thereto.

4. The device of claim 2, wherein the buttons of the first call input device are arranged in form of a matrix.

5. The device of claim 2, wherein the buttons of the first call input device are arranged in a single row.

6. The device of claim 1, wherein the second call input device comprises a rotary encoder that is configured to convert an angle change, caused by the passenger by turning the rotary knob by a specified angle, into a specified change in a manipulated variable, wherein the central control device is configured to convert the change into a floor change.

7. The device of claim 1, wherein the second call input device is configured to detect a touching of the rotary knob by the passenger as a confirmation action by the passenger and to generate a confirmation signal that the central control device recognizes as an input of the destination floor.

8. The device of claim 1, further comprising a display device that is communicatively connected to the central control device and configured to, when activated by the central control device, display the floor input by the first call input device or the floor determined by the second call input device.

9. The device of claim 7, wherein the first call input device is disposed on a passenger side between the display device and the second call input device.

10. An elevator system comprising:

an elevator car; and an elevator controller;

an elevator operating device for inputting a travel request for the elevator system, the device comprising:

a communication device that is configured to communicate with the elevator controller of the elevator system;

a central control device that is communicatively connected to the communication device;

a first call input device that is communicatively connected to the central control device, wherein the first call input device comprises buttons that are each assigned to a floor of a building and are disposed in the elevator operating device so as to be accessible to a first passenger for inputting a destination floor; and a second call input device that is communicatively connected to the central control device and is disposed so as to be accessible to a second passenger for inputting a destination floor step by step, wherein the first call input device and the second call input are disposed at a distance, wherein the second call input device comprises a rotary knob configured as a retractable rotary knob that has a control element having a passenger-side front side, wherein, in a retracted position, the front side of the control element is substantially planar with a passenger-side front surface of the elevator operating device, and wherein, in a protruding position, the control element protrudes from the passenger-side front surface.

11. The elevator system of claim 10, wherein the elevator operating device is disposed in an elevator car of the elevator system.

12. The elevator system of claim 10, wherein the elevator operating device has a housing that is configured to dispose the elevator operating device on a floor of a building.

13. A method for operating an elevator system, the method comprising:

detecting when an elevator operating device is touched, which device is disposed in the elevator system and comprises a first call input device having buttons that are each assigned to a floor of a building and are disposed in the elevator operating device so as to be accessible to a first passenger for inputting a destination floor, and comprises a second call input device, wherein the second call input device is disposed so as to be accessible to a second passenger for inputting a destination floor step by step, wherein the second call input device comprises a rotary knob configured as a retractable rotary knob that has a control element having a passenger-side front side, wherein, in a retracted position, the front side of the control element is substantially planar with a passenger-side front surface of the elevator operating device, and wherein, in a protruding position, the control element protrudes from the passenger-side front surface, and wherein the first call input device and the second call input device are disposed at a distance from each other;

displaying a destination floor on a display device of the elevator operating device when the first passenger touches a button on the first call input device in order to input a travel request to a desired destination floor of the first passenger;

changing the floor step by step and displaying the changed floor on the display device when the second passenger touches the second call input device to select a desired destination floor of the second passenger;

detecting a confirmation input at the second call input device by the second passenger, whereby the displayed floor is input as an elevator call to the desired destination floor of the second passenger; and registering and executing the elevator call input by the first or second passenger.

14. The method of claim 13, wherein the second call input device comprises a rotary encoder that is configured to convert an angle change, caused by the passenger by turning the rotary knob by a specified angle, into a specified change in a manipulated variable, wherein the central control device is configured to convert the change into a floor change.

* * * * *